No. 778,714. PATENTED DEC. 27, 1904.
E. O. SCHWEITZER.
ELECTRIC COMPENSATOR.
APPLICATION FILED DEC. 14, 1903.
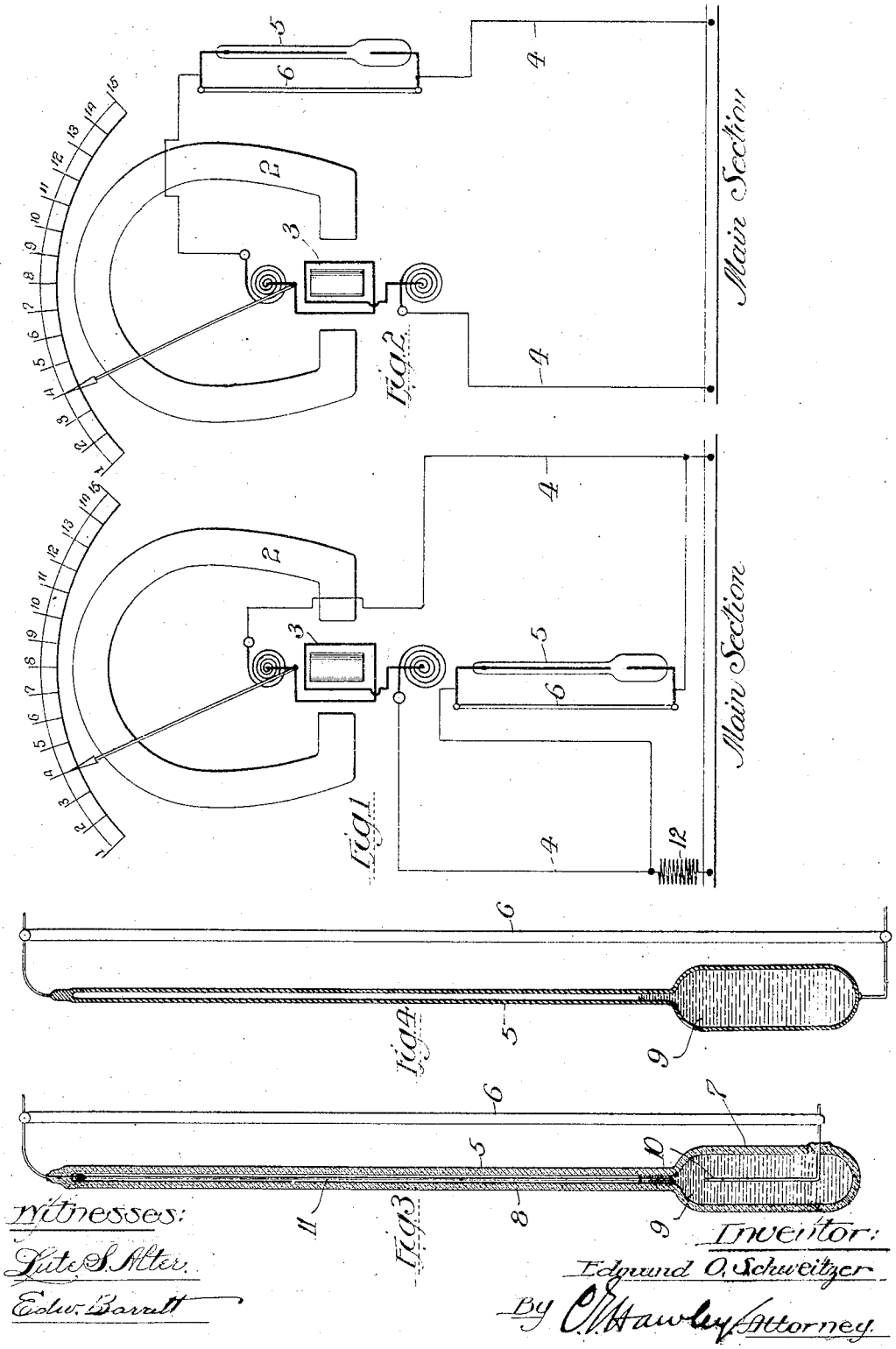

No. 778,714.   Patented December 27, 1904.

UNITED STATES PATENT OFFICE.

EDMUND O. SCHWEITZER, OF CHICAGO, ILLINOIS, ASSIGNOR OF ONE-HALF TO JOHN J. SCHAYER, OF CHICAGO, ILLINOIS.

ELECTRIC COMPENSATOR.

SPECIFICATION forming part of Letters Patent No. 778,714, dated December 27, 1904.

Application filed December 14, 1903. Serial No. 185,093.

*To all whom it may concern:*

Be it known that I, EDMUND O. SCHWEITZER, a citizen of the United States, residing at the city of Chicago, in the county of Cook and State of Illinois, have invented a certain new, useful, and Improved Electric Compensator, of which the following is a specification.

My invention relates to measurement of electricity, and has special reference to meter compensation.

The invention refers particularly to means for automatically correcting the errors caused in electric instruments by internal or external variations of temperature, resulting in changes of electric resistance in the circuit which includes said instrument or in the main-line section whereon the energy is measured. Instruments that are used for indicating or recording the fall of potential between two points upon an electric main are particularly sensitive or responsive to such changes of resistance. Such an instrument is actuated by a component part of the energy from the electric main. In adapting the instrument to the particular duty to be performed the electric resistances of the measuring shunt or section of said main and of the instrument, including its circuit, are determined at a certain temperature called the "normal" temperature. While this temperature remains constant in the main and the instrument, the ratio of resistances in the main and the instrument will be constant, and the instrument will derive the exact proper actuating-current from the electric main. Under such conditions the instrument will accurately indicate the fall of potential between two points upon the main or if of a certain class will give an accurate reading in amperes; but it is well known that the resistance of the metals which are commonly used in electric conductors varies according to the temperature of the metal, increasing with a rise of temperature. Any change from the normal temperature therefore results in changing the electric resistance of the measuring section or shunt in the main or of the windings of the electric instrument, or both. In either case the proper ratio of resistances is disturbed or distorted, and the indications of the instrument will be high or low, according as the increase of resistance occurs in the electric main or in the instrument-windings or local circuit. The errors thus occasioned become material when the instrument is employed upon a main which leads from a large electric generator, frequently amounting in a final careful determination to a difference of many kilowatts. Out of this fact has grown up the practice, the necessity, in fact, of observing the temperature of the medium or atmosphere in proximity to the conductor section or shunt and in proximity to the electric instrument and the using of such observations in conjunction with the known temperature coefficients of the metals serving as conductors in careful mathematical calculations, having for their purpose the correction of meter errors, to the end that the quantitative determination of the energy upon the main shall be definite and accurate.

The object of my invention is to provide a device which used in connection with an electric measuring instrument shall automatically compensate temperature-induced resistance and do away with the necessity for supplementary mathematical calculations or determinations. Stated in different words, the object of my invention is to provide means for automatically maintaining the actuating-current in the windings of an electric instrument in constant ratio with the main current whereof it is a component part and which shall accomplish this end by manipulating or varying the resistance of the meter-circuit.

The specific object of my invention, so far as same affects commercial usages, is to do away with the necessity for using either what is known as a "negligible-temperature-coefficient shunt" or a compensating coil of the same metal as the shunt-section of the electric main and wound to assume the same temperature as said shunt-section and in series with the meter, neither of which accomplishes the purpose for which it is intended.

My invention consists, broadly, in a compensator comprising a device to be included in the circuit of an electric measuring instrument and whose conductivity changes or varies in proportion to the variations of temperature experienced by said instrument or an electric part wherewith it is associated, said device operating automatically to adjust the resistance of the meter-circuit to correspond to the variations of resistance produced by such changes of temperature in the instrument or connected part and causing the instrument to at all times receive its proper component of actuating-current, and, further, my invention consists in a compensating instrument comprising a variable-resistance member sensitively responsive to changes of temperature, in combination with a fixed-resistance member which reduces the effective resistance of the first member as required to make the same correspond exactly to the temperature coefficient of the electric part whose abnormal or temperature-induced resistance is to be compensated for, and, further, my invention consists in details of construction and in combinations of parts, all as hereinafter described, and particularly pointed out in the claims.

My invention will be more readily understood by reference to the accompanying drawings, forming a part of this specification, in which—

Figure 1 is a diagrammatic view illustrating an electric compensator embodying my invention in connection with an electric measuring instrument, showing the manner of using the compensator when negative instrument compensation is required. Fig. 2 is a similar diagrammatic view showing the manner of arranging the compensator in the meter-circuit when positive instrument compensation is required. Fig. 3 is an enlarged sectional view of the electric compensator, and Fig. 4 is a similar sectional view of one of several modifications of the compensator.

As shown in the drawings, 2 represents an electric measuring instrument of the kind used for indicating a fall of potential.

3 represents the winding of the instrument.

4 4 are the two leads of the meter or local circuit, the terminals of which are connected to the main whereon the fall of potential is to be measured.

It is well known and will be obvious to all that an increase of resistance in the section of the electric main which lies between the terminals of the meter-circuit will cause a proportionately-greater current intensity in said circuit due to the deflection of current therethrough, assuming that the resistance of the meter-circuit remains substantially constant while that of the main increases. This condition produces an excessive actuation and indication by the instrument, showing or recording a fall of potential that is disproportionate to the actual current intensity upon the main. Reverse conditions and requirements are met with where the part whose resistance detrimentally affects the operation of the instrument is found in the instrument itself or in its local circuit. In this case an increase of resistance in the meter-circuit causes a proportional deflection of the current from said circuit, so that the instrument fails to receive its full component of actuating-current. Voltmeters or measuring instruments which are used to indicate a fall of potential proportional to a current flowing in a main or conductor are at present connected as follows: The terminals on the instrument are connected to the extremities of the shunt. In this case the shunt is composed of a metal whose resistance is not appreciably varied by changes of temperature, and the principal error that occurs takes place in the copper windings of the instrument itself, since these windings change their resistance with changes of temperature and are always made of copper. In another case where it is desired to dispense with the shunt having a negligible temperature coefficient or metal composed of material whose resistance is not changed by changes of temperature the conductor or section of the main or feeder itself is used, which of course has a variable resistance due to its appreciable temperature coefficient. It becomes desirable to use this copper section or shunt on the main or feeder in order to dispense with the mechanical difficulties and expense encountered in connecting a shunt of negligible temperature coefficient, also to gain the room which this shunt takes up as compared to the room naturally occupied by the copper feeder, also to decrease the drop or fall of potential in the feeder itself and its consequent dissipation of energy. When the shunt or section of the main circuit is composed of copper, an attempt is frequently made to have the resistance of the local or meter circuit vary in proportion to the resistance of the section of the main circuit by connecting in series with the meter a fine-wire coil, which constitutes ninety per cent. or more of the entire resistance of the meter-circuit. This coil in order to have the resistance of the meter-circuit change the same way that the resistance of the shunt or section of the main circuit does should be located in a place on the shunt or section of the main circuit which represents the mean temperature of the shunt or section of the main circuit. In practice it is found that this can never be located, and even if it could be located it would be impracticable to put the coil on at such location. It follows, therefore, that it is much more simple to determine the mean temperature in which the shunt is immersed than it would be to determine the point at which the compensating coil should be located on the shunt, and to vary the resistance of the local or meter circuit according to the temperature in which the shunt or section of the main circuit is immersed. When the temperature-induced resistance is found to be in the measured section of the electric main, I conceive that the error should be corrected, not by substituting for the copper section an expensive and cumbersome section of composite metal nor by introducing a preponderating variable resistance in the meter-circuit as by a compensating coil, but should be accomplished by entering the instrument-circuit and directly varying the intensity of the current in the instrument-winding by diverting a portion of the current from said winding. Again, when the temperature-induced resistance that detrimentally affects the operation of the instrument is found to be in the instrument-circuit or in the instrument-winding itself, my conception is that the error should be corrected by again directly entering the instrument-circuit and arbitrarily varying its total resistance in inverse proportion to the variation of temperature, which produces the objectionable change in the ratio of the main and meter circuit resistances, and hence their current intensities.

The accomplishment of the corrective plans above stated is attained by introducing in the meter-circuit a device, which I call a "variable-resistance compensator," whose electric conductivity is directly proportional to the changes of temperature to which it and the part for which it compensates are exposed. The compensator preferably comprises a variable-resistance member 5 and a fixed-resistance member 6, that are arranged in parallel. The resistance of the member 5 has a definite range of resistance, and within the range its variations of resistance are exactly proportioned to the variations of temperature affecting it. These variations, however, are usually greater than the variations of resistance produced by the same changes of temperature in the instrument, its circuit, or the main conductor-section. It is necessary, therefore, to provide means for fitting or adjusting the effective changes of resistance by the member 5, so that the variation of resistance thereby will exactly compensate for and correspond to the change of resistance in the meter or its circuit including the main. The fixed resistance member 6 serves to thus adjust or fit the effective resistance of the member 5 to the particular instrument in question. It is composed of material having a negligible temperature coefficient—that is, of a composition whose conductivity is not appreciably altered by changes of temperature. Its resistance is determined to suit the requirements attending the use of the compensator and according to such requirements may be equal to or greater or less than the maximum resistance of the variable-resistance member 5. When, therefore, the two members are arranged in parallel relation and connected to a meter-circuit, each will carry a portion of current instead of all thereof having to traverse the member 5. This being the case, the effective variation of resistance by the automatically-operated member 5 will per unit of temperature variation be proportional to the relative resistances of the members 5 and 6 constituting the compensator. In other words, the effect of the resistance inherent to the member 5 will be reduced in proportion to the given conductivity of the fixed-resistance member 6, and as a matter of course the units or divisions of resistance in the member 5 will so far as concerns their effect upon the instrument-circuit represent less amounts.

Fig. 1 of the drawings illustrates an example of the use of the compensator where it is desired to produce negative compensation in the measuring instrument. In such a case the compensator is or will be arranged in proximity to the section of the main conductor, wherein the objectionable temperature-induced resistance occurs. As explained, such additional resistance in the electric main will cause a disproportionate current intensity in the windings of the instrument, while the resistance of said windings may be said to remain substantially constant. The error that would be occasioned by such a change of the ratio of resistance and intensities upon the main and the instrument is corrected by arranging the compensator, considered as a whole, in parallel with the measuring instrument. The effective resistance of the compensator is then by means of the fixed-resistance member 6 adjusted to correspond to the temperature coefficient of the section of main conductor. As a result its conductivity will properly increase as the conductivity of the measured section decreases, and vice versa. The arrangement of the compensator in parallel with the instrument results in the diversion of a portion of the current from the instrument and through the easier path afforded by the compensator in case of a rise of temperature therein. Thus the current intensity in the winding of the instrument depended upon for the actuation of said instrument will at all times be kept in proper ratio with the current intensity in the main conductor. In other words, when, so to speak, the instrument suffers abnormal actuation, because of a relative increase of current therein, the compensator will instantly provide a by-pass for a portion of the actuating-current and cause the instrument to assume its proper relation to the electric main and give an accurate indication of the fall of potential therein. It will be obvious that when the temperature of the shunt-section of the main conductor is from any cause reduced below the normal temperature the conductivity of the compensator will be correspondingly decreased, affording a more difficult path for the component of meter-current normally flowing therein, and thus causing a compensating increase of current in the windings of the instrument.

It will be necessary in some cases to provide a compensator and circuit connection of relatively large capacity or cross-section in order to reduce the intensity of current in the meter-winding. To avoid such necessity and to permit the manufacture and use of my compensator in a standard size or sizes, I prefer to reduce the current intensity between the terminals of the meter or derived circuit by inserting therein a small resistance-coil 12 of negligible temperature coefficient. The resistance of this coil is adjusted to meet prevailing conditions in every case, its adjustment corresponding to the adjustment of the fixed-resistance member of the compensator so far as concerns its adaptation to the particular circuit to be measured. This resistance-coil as here used constitutes a part of my invention, providing the drop of potential necessary to the effective working of the compensator in parallel with the instrument. The arrangement of the compensator in parallel with the instrument results in varying the amount of current flowing through the instrument by varying the fall of potential or electrical pressure in the small resistance-coil connected on the shunt side of the meter and compensator, and thus in series with both meter and compensator. This fall of potential is varied by temperature-induced changes of resistance in the meter or local circuit causing a variation of current and is due to variation of resistance of the compensator—that is, with increasing temperature the resistance of the meter-circuit is decreased, causing a greater fall of potential through the negligible-temperature-coefficient resistance-coil. This in turn decreases the pressure or potential on the terminals of the instrument or measuring device, which causes the latter to be actuated by a current of proper intensity.

The compensator illustrated in Fig. 2 is identical with that of Fig. 1; but it will be noted that it is differently arranged in the circuit of the meter 2. This illustrates a case where the instrument itself is subjected to changes of resistance in its own local circuit, which causes the instrument to receive less or more than its proper component of current from the electric main. The compensator is here arranged in series with the instrument, and when the resistance of the meter-circuit is changed by a change of temperature the compensator will automatically operate to adjust its own resistance to the changed condition of the meter-circuit and maintain the sum-total of the resistance upon the meter-circuit constant, thus permitting the instrument to receive its full and proper component of current from the electric main, so that it may accurately indicate the drop of potential between the points of measurements on the electric main.

These two examples of the general construction, operation, and use of my compensator will serve to show its value and point out other uses to which it may be applied. There will be cases in which it will be necessary to use two compensators in a meter-circuit in series parallel therewith—one near the instrument and another near the main conductor.

Proceeding now to a description of the construction of the compensator in detail and referring to Fig. 3 of the drawings, it will be observed that the variable-resistance member of the compensator comprises a tube of glass or other material having a bulb 7 and a preferably graduated tube portion 8, like unto a thermometer. This is sealed at the ends and incloses a small body of mercury or like fluid which is a conductor of electricity. The bulb 7 contains a sealed-in terminal wire or electrode 10, always immersed in the mercury or other liquid or substance. The tube 8 contains a long terminal wire or electrode 11 of desired composition and of preferably uniform cross section. The upper end of the wire is preferably sealed in the end of the tube, and preferably the wire nearly fills the capillary tube. The ends of the electrodes or wires 10 11 approach one another, but do not meet. They are, however, always electrically connected by the intervening stand of mercury. When the mercury or other substance constituting the movable element is expanded by heat, it rises in the tube and immerses more or less of the long electrode 11, according to the temperature attained. The temperature coefficient of the electrode 11 may be, and preferably is, a negligible quantity, and the composition of such electrode and its cross-section, the cross-section of the mercury-column, and the conductivity of the mercury are all determined according to the conditions under which the compensator will be used. The physical and electrical properties of the parts of the compensator may be so carefully determined and adjusted that the member 5 may alone be used in an instrument-circuit; but generally no effort is made to adapt the member 5 to any particular measuring instrument, the fixed member 6 being depended upon for such exact adaptation. The cross-sections of the tube 8, fluid-column, and electrode 11 are substantially uniform throughout. Therefore the resistance of such parts will be regularly varied with each unit of rise or fall of the liquid within the tube. The conductivity of the member 5 will therefore be directly proportional to the height of the liquid within the tube. The tube is calibrated like a thermometer to determine its range and variations of resistance and to provide the tube with thermometric graduations. The maximum resistance of the member 5 when the mercury therein is at a point corresponding to the lowest temperature to which it is likely to be subjected is preferably always proportionally greater than the range of temperature-induced resistance compensated for. As stated, the parallel or fixed-resistance member 6 of the compensator serves to adjust and fit the effective variation of resistance by the member 5 to a particular case, and the size or cross-section and length, as well as the composition of the member 6, is determined for each instrument.

My invention is capable of embodiment in many forms, of which that described is one. Another form is illustrated in Fig. 4, wherein a metal tube is employed in place of the glass tube of Fig. 3. In this case the tube is partially filled with mercury or other liquid and the electric connections are made to the ends of the tube. The liquid within the tube is preferably of greater conductivity than the walls of the tube, and the resistance of the device as a whole is therefore varied according to the height or length of the column of liquid in the tube, the resistance being reduced as the column approaches the top of the tube. The rate of variation of conductivity should be changed and altered as required for each meter, and I prefer to always employ a fixed resistance 6 with this metallic form of the variable-resistance member 5.

It is obvious that numerous modifications of my invention will readily suggest themselves to one skilled in the art, and I therefore do not confine the invention to the specific constructions, relations of parts, or uses herein shown and described.

Having thus described my invention, I claim as new and desire to secure by Letters Patent—

1. The combination, of an electric measuring instrument or the like, and its derived circuit, with an electric compensator, comprising a member whose electric resistance is varied by changes of temperature and a fixed-resistance member, said members being connected in parallel, and together suitably included in the circuit of said instrument, substantially as described.

2. The combination, of an electric measuring instrument or the like, and its circuit, including the electric main, with an electric compensator comprising two members one of excessively-variable resistance and the other of adjusted fixed resistance arranged in parallel in the instrument-circuit and whose summative conductivity is reversely responsive to changes of temperature, to the extent of the detrimental, temperature-induced resistance, substantially as described.

3. An electric compensator, comprising a suitable tube containing an expansible fluid, provided with suitable electric terminals and whose electric resistance varies with the expansion or contraction of the fluid in the tube, in combination with a fixed-resistance part or by-pass arranged between said terminals, whereby the effective resistance of the device is determined, substantially as described.

4. An electric compensator, comprising a thermometer-like tube of non-conducting material and containing a conductive fluid, in combination with electrodes of negligible temperature coefficient provided in said tube and having terminals on the exterior thereof, the effective resistance of said electrodes being varied by the expansion and contraction of the fluid in said tube, substantially as described.

5. An electric compensator, comprising a thermometer-like tube of non-conducting material and containing a conductive fluid, in combination with electrodes provided in said tube and having terminals on the exterior thereof, the effective resistance of said electrodes being varied by the expansion and contraction of the fluid in said tube, and a fixed-resistance member arranged between said terminals and providing an electrical by-pass, serving to diminish the normal rate of resistance variation by the expansion and contraction of the said fluid, substantially as described.

6. The combination, of an electric measuring instrument or the like and its circuit, including an electric main, with a compensator comprising a negligible-temperature-coefficient resistance member and a variable-resistance member which is physically operated by changes of temperature, said members together automatically maintaining the proper relation between the current intensity in said instrument and that of said main, substantially as described.

7. An electric compensator for electric measuring instruments and the like, comprising a variable-resistance member, automatically physically and electrically responsive to changes of temperature and a fixed-resistance member whose resistance is permanently adjusted with relation to the duty to be performed by said variable-resistance member, said members being electrically connected, substantially as and for the purpose specified.

8. The combination, of a main electric circuit and a derived circuit, including a measuring instrument or the like, with a compensating device comprising electrically-connected automatically variable and fixed resistance members arranged in said derived circuit and whose summative conductivity is inversely proportional to the conductivity of that circuit wherein detrimental variations of resistance are produced by changes of temperature, substantially as described.

9. The combination, of an electric main and a derived circuit including a measuring instrument or the like, with resistance of negligible temperature coefficient arranged in one lead of said circuit, and a compensating device whose conductivity is inversely proportional to that of the measured section of the electric main, and which is connected in parallel with the instrument in said derived circuit but in series with said resistance, substantially as described.

10. The combination, with an electric main, of a derived circuit, an electric measuring instrument arranged in said derived circuit, electric resistance of negligible temperature coefficient arranged in said derived circuit and adjusted to suit requirements, and an electric compensator arranged in series with said resistance and in parallel with said instrument, and comprising a variable-resistance member responsive to changes of temperature, and a properly-adjusted fixed-resistance member in parallel relation therewith, substantially as described.

11. A suitable tube, closed at its ends and containing an expansible fluid, in combination with suitable terminals and an electrode of negligible temperature coefficient arranged in said tube, in electrical connection with said fluid, the whole constituting an electric compensator the electric resistance of which varies with the expansion or contraction of said fluid in said tube, substantially as described.

12. An electric compensator comprising a temperature-actuated variable-resistance member whose conductivity is excessively varied by changes of temperature in the surrounding atmosphere, and electrically-adjusted means in parallel circuit relation with said member, the resistance of said means being such as to reduce the effective resistance of said member and fix the variations thereof according to the duty to be performed, substantially as described.

In testimony whereof I have hereunto set my hand and seal, this 8th day of December, A. D. 1903, in the presence of two witnesses.

EDMUND O. SCHWEITZER. [L. S.]

Witnesses:
C. G. HAWLEY,
B. K. SEFTON.